United States Patent
Ginsberg et al.

(10) Patent No.: US 9,993,769 B2
(45) Date of Patent: Jun. 12, 2018

(54) METHOD AND SYSTEM FOR GAS SCRUBBING OF AEROSOL-CONTAINING PROCESS GASES

(71) Applicant: RWE Power Aktiengesellschaft, Essen (DE)

(72) Inventors: Tobias Ginsberg, Duesseldorf (DE); Peter Moser, Cologne (DE); Sandra Schmidt, Wuppertal (DE); Knut Stahl, Hamm (DE); Sarah Wallus, Muehlheim an der Ruhr (DE)

(73) Assignee: RWE POWER AKTIENGESELLSCHAFT, Essen (DE)

( * ) Notice: Subject to any disclaimer, the term of this patent is extended or adjusted under 35 U.S.C. 154(b) by 64 days.

(21) Appl. No.: 15/022,364

(22) PCT Filed: Sep. 16, 2014

(86) PCT No.: PCT/EP2014/069660
§ 371 (c)(1),
(2) Date: Mar. 16, 2016

(87) PCT Pub. No.: WO2015/036603
PCT Pub. Date: Mar. 19, 2015

(65) Prior Publication Data
US 2016/0279563 A1   Sep. 29, 2016

(30) Foreign Application Priority Data

Sep. 16, 2013  (DE) .................. 10 2013 015 280

(51) Int. Cl.
*B01D 53/76*   (2006.01)
*B01D 53/14*   (2006.01)
(Continued)

(52) U.S. Cl.
CPC ......... *B01D 53/501* (2013.01); *B01D 53/145* (2013.01); *B01D 53/1475* (2013.01);
(Continued)

(58) Field of Classification Search
None
See application file for complete search history.

(56) References Cited

U.S. PATENT DOCUMENTS 3,963,463 A * 6/1976 Huppke ............... B01D 47/04
                                                          96/178
8,486,357 B1    7/2013 Ito et al.
(Continued)

FOREIGN PATENT DOCUMENTS

CN    101185837 A    5/2008
CN    101708414 A *  5/2010  ............ B01D 53/78
(Continued)

OTHER PUBLICATIONS

English language PCT International Search Report dated Dec. 22, 2014, received in corresponding PCT Application No. PCT/EP14/69660, 2 pgs.
(Continued)

*Primary Examiner* — Daniel Berns
(74) *Attorney, Agent, or Firm* — Grossman, Tucker, Perreault & Pfleger, PLLC

(57) ABSTRACT

The invention relates to a method and to a system for gas scrubbing of aerosol-containing process gases using an amine-containing solvent as scrubbing agent, which is brought into contact with the process gas in an absorber column (9) and which is regenerated in a desorber column (13) and after cooling is delivered to the absorber column (9) again. The water vapor concentration of the process gas which is not saturated with water vapor is increased with water before the gas scrubbing in the absorber column (9),
(Continued)

Figure 1:
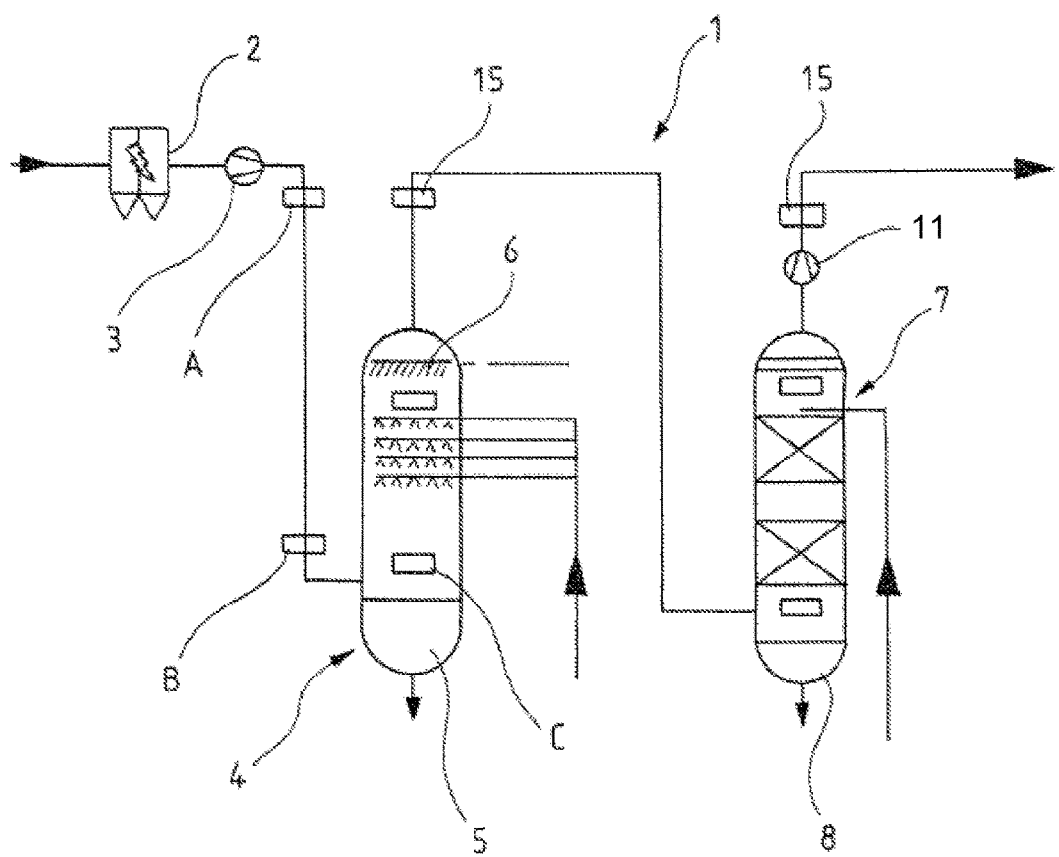

preferably to a degree of saturation of >0.8, such that water is condensed out of the gas phase on aerosol particles contained in the process gas, and in a following method step the aerosol particles which have grown in size are precipitated out of the process gas before the gas scrubbing.

4 Claims, 2 Drawing Sheets

(51) Int. Cl.
*B01D 53/48* (2006.01)
*B01D 53/52* (2006.01)
*B01D 53/78* (2006.01)
*B01D 53/96* (2006.01)
*B01D 53/50* (2006.01)
*B01D 53/62* (2006.01)

(52) U.S. Cl.
CPC ......... *B01D 53/1481* (2013.01); *B01D 53/62* (2013.01); *B01D 2251/304* (2013.01); *B01D 2251/404* (2013.01); *B01D 2251/604* (2013.01); *B01D 2251/606* (2013.01); *B01D 2252/103* (2013.01); *B01D 2252/20484* (2013.01); *B01D 2257/302* (2013.01); *B01D 2257/504* (2013.01); *B01D 2258/0283* (2013.01); *Y02C 10/04* (2013.01); *Y02C 10/06* (2013.01)

(56) References Cited

U.S. PATENT DOCUMENTS

| | | |
|---|---|---|
| 2011/0052453 A1 | 3/2011 | McLarnon et al. |
| 2011/0076216 A1 | 3/2011 | Orita et al. |
| 2011/0303089 A1* | 12/2011 | Xu .................. B01D 3/008 95/213 |
| 2013/0142712 A1* | 6/2013 | Nagayasu ............. B01D 53/75 422/619 |

FOREIGN PATENT DOCUMENTS

| | | |
|---|---|---|
| EP | 2578295 A1 | 4/2013 |
| EP | 2578296 A1 | 4/2013 |
| EP | 2578297 A1 | 4/2013 |
| EP | 2578298 A1 | 4/2013 |
| EP | 2653210 A1 | 10/2013 |
| WO | 2008107050 A1 | 9/2008 |
| WO | 2008127557 A1 | 10/2008 |
| WO | 2013004731 A1 | 1/2013 |

OTHER PUBLICATIONS

German language PCT Written Opinion dated Dec. 22, 2014, received in corresponding PCT Application No. PCT/EP14/69660, 5 pgs.

English language translation of PCT International Preliminary Report on Patentability dated Mar. 17, 2016, received in corresponding PCT Application No. PCT/EP14/69660, 12 pgs.

Yang Linjun, "Pollution Control Technology of Fine Particulate Matter in Combustion", Chemical Industry Press, Jun. 2011, pp. 132-170, with English language translation included, received in related Chinese Application No. 201480058483.9.

* cited by examiner

METHOD AND SYSTEM FOR GAS SCRUBBING OF AEROSOL-CONTAINING PROCESS GASES

The invention relates to a method for gas scrubbing of aerosol-containing process gases, using an amine-containing solvent as scrubbing agent that is brought into contact with the process gas in an absorber column and which scrubbing agent is regenerated in a desorber column and, after cooling, is fed back to the absorber column.

Such methods for removing acid gases from process gases by means of amine-containing solvents are proven on the large scale, in particular in the chemical and petrochemical industries, and also in the gas industry. These methods in recent years have attained importance with carbon dioxide capture and storage (CCS), in particular for use in fossil-fired power plants or in the steel and cement industries. A broader use of the carbon dioxide capture technique, in particular in the case of power plants that are operated using fossil fuels, needs measures to be taken for reducing emissions from the separation plants. These measures are comparatively relevant, in particular in the case of large process gas streams. For example, the flue gas stream of a large power plant block is between 2 to 4 million $m^3/h$. Measures for decreasing emissions from the separation plants serve both for environmental protection and also the approvability of the relevant plants, and also decreasing the operating costs of $CO_2$ capture.

In the prior art, in principle the problem is known that at the top of absorber columns, a significant loss of scrubbing agent takes place in the gaseous state and in the form of a scrubbing agent mist discharge. In the case of a typical amine scrubbing process, process gas is first conditioned in a fine scrubbing column in order to establish the optimum gas temperature for the amine scrubbing process and to extract interfering trace substances by addition of additives. Then, in a scrubbing column or absorber column, the relevant acid gas component in the process gas, for example $CO_2$, is scrubbed out at low temperature using an aqueous amine solution, for example using a mixture of water with monoethanolamine (MEA). After the $CO_2$-loaded scrubbing agent has been preheated by $CO_2$-poor scrubbing agent in a counterflow heat exchanger, it is introduced into a desorber column (also termed stripper or regeneration column). There, the $CO_2$ is liberated in the gaseous state by heating the scrubbing agent. After cooling in the counterflow heat exchanger, the $CO_2$-poor scrubbing agent is reintroduced into the absorber column.

Such a method is known, for example, from EP 2 131 945 B1, which is hereby incorporated in its entirety by reference, also for the purpose of disclosure. To minimize the emissions of amines and volatile decomposition products from the scrubbing agent, the absorber column has a water scrubber at the top of the absorber, in which water scrubber, by direct contact of cooled circulation water with the $CO_2$-poor process gas, the amine and other organic trace substances transfer from the gas phase to the liquid phase, as a result of which the concentration of the amine and other organic trace substances is reduced in the gas phase and thus the emissions are lowered. Depending on process and amine properties, a further post-scrubbing step can be provided, in which a component can be added to the scrubbing water, which component reacts chemically with the amine. By this measure, the emission level for amines can be decreased to relatively low concentrations in the $CO_2$-poor process gas that result from the equilibrium thermodynamics of the chemical reaction, more precisely by reducing the vapor pressure of the amine, on account of the reaction thereof with the added reaction partner.

However, studies at research institutes have found that the emission concentrations are actually 1 to 2 orders of magnitude above the values to be expected by means of equilibrium thermodynamics and vapor pressure. The reason for this appears to be that the mechanism of the scrubbing agent discharge is predominantly based on the emission of aerosol particles that are loaded with amines and organic trace substances from the scrubbing agent.

The above described problem is already discussed in WO 2013/004731 A1. In this application, it is assumed that the scrubbing agent discharge is substantially due to ultrafine solid particles in the fly ash of flue gas/process gas that act as fog-forming agents in the process gas, or as condensation nuclei. Fog formation is also ascribed to the circumstance that the stripped/regenerated and cooled scrubbing agent is fed back to the absorber with a relatively high temperature difference with respect to the enriched scrubbing agent, as a result of which an abrupt cooling of the saturated gas mixture, and accompanying fog formation, is effected. Accordingly in WO 2013/004731 A1, with reference to solution of the problem, it is proposed to restrict the temperature difference between regenerated scrubbing agent and enriched scrubbing agent to <5° C., in order in this way to suppress scrubbing agent fog formation.

To solve the above described problem, a different method is proposed in EP 2 578 297 A1. In this document, the fog formation is ascribed to the aerosol-generating gaseous components of the process gas such as, for example, $SO_3$, $NHO_3$, HCl, and also steam in the gas phase. In the case of a $CO_2$ scrubber which is downstream of a flue gas desulfurization of a steam generator, therefore, by cooling the process gas in a cooler, a transfer of the gas components mentioned from the gas phase to a fog phase/condensation phase is proposed. The resultant fog is then, in a demister/droplet separator, kept out of the process gas stream upstream of the $CO_2$ separation.

The use of demisters and wet electrostatic precipitators is also discussed in this context in WO 2013/004731 A1, the use of which, there, is however rejected for a large-scale process such as, for example, flue gas scrubbing. Furthermore, demisters, for example, are only effective for retention of aerosol particles of the order of magnitude from 1 to 3 µm.

The above described problem and also similar solutions are discussed, for example, in the documents EP 2 578 297 A1, EP 2 578 298 A1, EP 2 578 295 A1 and EP 2 578 296 A1. The known abovementioned measures are suitable in principle to decrease the amine emissions, but would not be absolutely satisfactory in such orders of magnitude.

A method for gas scrubbing of aerosol-containing process gases using an amine-containing solvent as scrubbing agent having an upstream flue gas desulfurization unit is also known, for example, from U.S. Pat. No. 8,486,357 B1. In this document, a scrubbing tower for flue gas desulfurization is described in which a fine scrubber of the flue gas is provided in the upper part of the scrubbing tower. This fine scrubber comprises a flue gas cooling with a cooling liquid in the form of flue gas condensate. At the top of the scrubbing stream, a conventional demister is provided.

The object of the invention is therefore to provide a method and system for gas scrubbing of aerosol-containing process gases, and use of an amine-containing solvent as scrubbing agent, in which the amine emissions are significantly reduced.

The object is achieved by a method having the features of claim 1. Advantageous developments result from the subclaims.

The object is in addition solved with a corresponding system for gas scrubbing of aerosol-containing process gas according to claim 7.

The invention is based on the knowledge that the actual reason therefor is that the mechanism of the scrubbing agent discharge is predominantly based on the emission of aerosol particles that are loaded with amines and organic trace substances from the scrubbing agent. However, the applicant, in experiments, has discovered that the removal or minimization of solid particles (aerosol particles) having a size of ≤0.2 μm in the process gas stream is critical for the reduction of emissions. It is exactly the finest aerosol particles that lead to a formation of very fine fog droplets that cannot be retained from the process gas stream using conventional droplet separators or wet electrostatic precipitators.

Therefore, according to the invention it is proposed to increase the relatively low water vapor concentration of the process gas with water before the gas scrubbing in the absorber column, preferably to a degree of saturation of >0.8, in such a manner that water from the gas phase condenses on aerosol particles present in the process gas and thus leads to an increase in size of the relevant aerosol particles. This diameter enlargement, for example to a size of 1 to 10 μm, has the effect that the enlarged aerosol particles can be retained from the process gas in a subsequent method step. The precipitation can proceed by corresponding internals in the gas conduit or, for example, also with the aid of an electrical field.

The invention can therefore be summarized to the effect that according to the invention the solid particles in the size range of up to 0.2 μm that are responsible for the emissions from the amine removal process are precipitated before entry into the actual amine removal process. This precipitation or reduction of the solid particles in the size range of <0.2 μm is effected by growth in size and ultimate precipitation of the relevant aerosol particles.

It has proved to be advantageous to adjust the concentration of the aerosol particles having a diameter<0.2 μm in the process gas before the gas scrubbing to <60 000 particle/$cm^3$.

The aerosol particles in the process gas can be measured, for example, using a spectrometric measuring appliance. Such a measuring appliance is offered, for example, by the company TSI Incorporated under the name "Fast Mobility Particle Sizer". Using such a measuring appliance, aerosol particles in the order of magnitude from 5.6 to 560 nm and also the size distribution thereof, may be measured in real time.

In an expedient variant of the method according to the invention, it is provided that the water vapor concentration of the process gas is adjusted by quenching with water or an aqueous fluid or by steam addition. "Quenching" in the technique, denotes the rapid cooling of hot gases by evaporative cooling, using gas-liquid contact apparatuses (quenches).

For example, the water vapor concentration of the process gas can also be adjusted by passing it through a foam scrubber, dispersant scrubber, or bubble-layer scrubber. Such gas-liquid contact apparatuses are apparatuses having perforated plates, roller plates or tube internals in which the gas flows through a liquid layer or foam layer. For this purpose, a fluid that has a lower temperature than the process gas is applied to the perforated plates or the roller internals or tube internals and the process gas flows therethrough.

The aerosol particles can be precipitated, for example, using droplet separators, corona-aerosol separators or wet electrostatic precipitators.

Preferably, the aerosol particles, after increase in size by water vapor condensation, are precipitated in a corona-aerosol separator or in a wet electrostatic precipitator.

In a particularly preferred and expedient variant of the method according to the invention, said method comprises the gas scrubbing of flue gas from a power plant as aerosol-containing process gas, wherein the method comprises a wet flue gas desulfurization and also a $CO_2$-capture downstream of the flue gas desulfurization as gas scrubbing.

The invention further relates to a system for gas scrubbing of aerosol-containing process gases, in particular for the multistage gas scrubbing of flue gases from a power plant process, or steel or cement production process, comprising at least one flue gas exhaust preferably having an electrostatic precipitator, a wet flue gas desulfurization unit, a $CO_2$ scrubber downstream of the desulfurization unit having an absorber column and a desorber column, wherein the system comprises at least one quench, preferably in the form of a spray scrubber or injection cooler, or at least one foam scrubber, dispersant scrubber or bubble-layer scrubber which is connected downstream of the electrostatic precipitator and upstream of the absorber column. The system further comprises at least one aerosol particle separator that is connected downstream of the quench and is connected upstream of the absorber column.

A wet flue gas desulfurization unit in the context of the present invention comprises a wet scrubber in the form of a scrubbing column or an absorber tower in which flue gas is cooled, saturated with water and freed from $SO_2$ by a limestone suspension/milk of lime which trickles through the absorber tower. The resultant gypsum suspension collects in the sump of the absorber tower and is ejected therefrom, and, after separating off the resultant gypsum, is recirculated in hydrocyclones. According to the invention, it is provided to quench the flue gas or process gas before, during or after a wet flue gas desulfurization and to precipitate, in an aerosol particle separator, the aerosol particles that have grown in size owing to the quenching.

In principle, it is possible to implement the quench and the aerosol particle separator in one unit. For example, the quench and/or the aerosol particle separator can be arranged in an absorber or scrubbing tower of the flue gas desulfurization unit. Alternatively, it can be provided, for example, to connect the quench upstream of the flue gas desulfurization unit and to connect the aerosol particle separator downstream of the flue gas desulfurization unit. In particular, by arranging the quench upstream of the flue gas desulfurization unit, it is ensured that the flue gas has a relatively high temperature level in such a manner that the maximum temperature difference during quenching can be utilized. As a result, a growth of the fine aerosol particles that is as rapid as possible can be achieved by condensation of water thereon, as a result of which it is ensured that the aerosol particles that have grown in size can be removed from the process gas, for example by electrostatic aerosol precipitation.

Preferably, the system according to the invention comprises, as aerosol particle separator, at least one wet electrostatic precipitator or at least one corona-aerosol separator, which is preferably connected downstream of the flue gas desulfurization unit. The wet electrostatic precipitator comprises a high-voltage field with collecting electrodes and discharge electrodes. The particles and aerosols still present in the gas are negatively charged and migrate in the electrical field to the collecting surface. The collecting surfaces and discharge electrodes are kept clean optionally by means of rinsing appliances. When a corona-aerosol separator is used, the aerosol particles are charged in an electric field and precipitated on electrodes.

Figure 2:
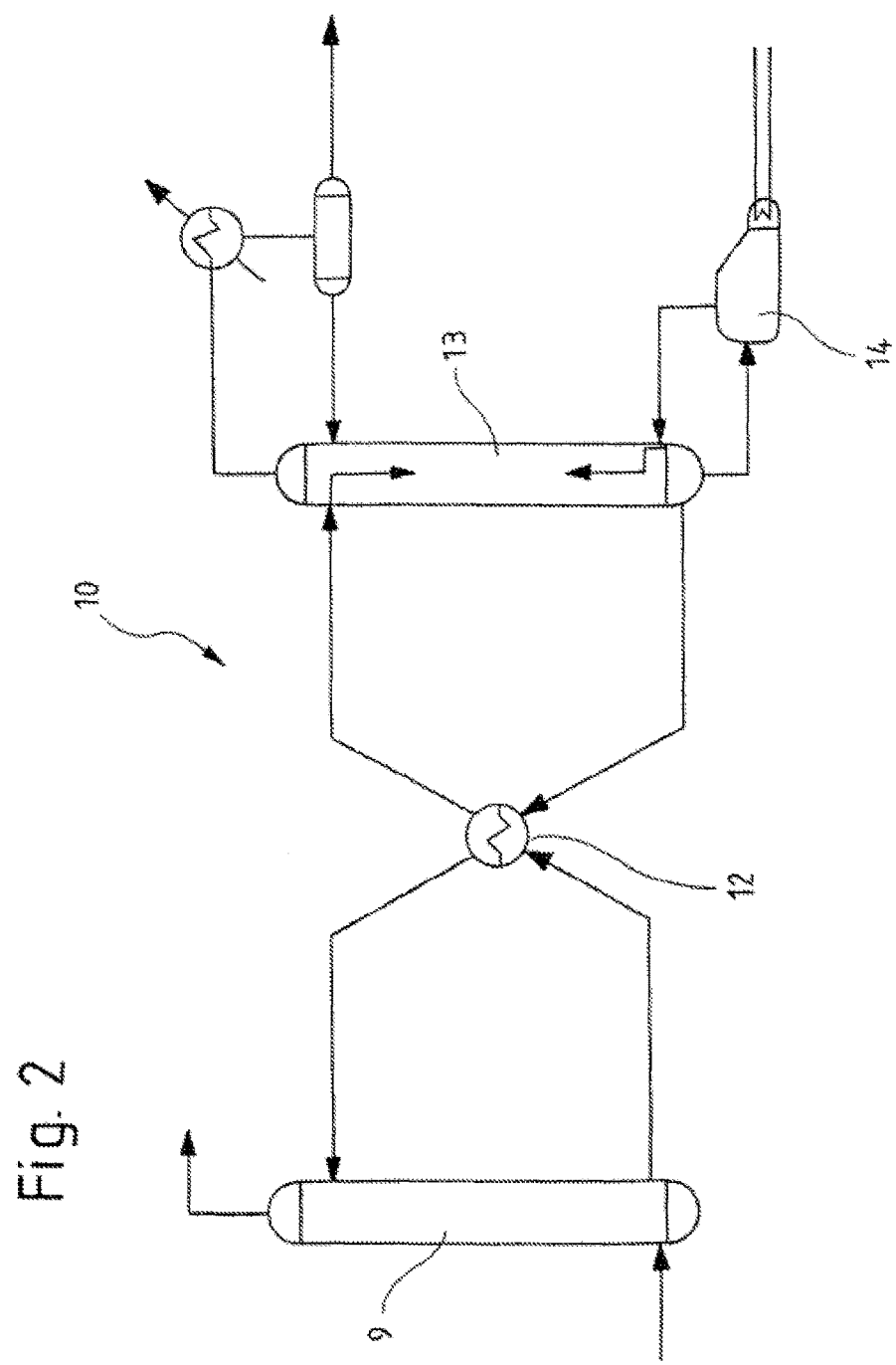

The invention will be described hereinafter with reference to an exemplary embodiment illustrated in the drawings:

In the drawings:

FIG. 1 shows a method flowchart which illustrates the flue gas desulfurization of the flue gas from a fossil-fuelled steam generator that is illustrated schematically and FIG. 2 shows a schematic method flowchart of the $CO_2$ scrubber connected downstream of the flue gas desulfurization unit.

First reference is made to FIG. 1.

The flue gas desulfurization unit 1 shown there is arranged, for example, in the flue gas pathway of a coal-fired power plant (that is not shown). The dirty gas from the coal firing is very largely freed from fly ash in an electrostatic precipitator 2.

An induced draft having a first fan 3 is connected downstream of the electrostatic precipitator 2, which first fan 3 compensates for the pressure drops in the flue gas pathway. That is to say flue gas that is not saturated with water is first fed to a scrubbing tower 4 (wet scrubbing) of the flue gas desulfurization unit 1. According to whether heat decoupling from the flue gas before entry into the flue gas desulfurization unit 1 is provided or not, the temperature of the flue gas is typically between 105° C. and 140° C.

Within the scrubbing tower 4, the flue gas is conducted in counterflow to a limestone suspension ($CaCO_3$/milk of lime). The $CaCO_3$ is oxidized with the $SO_2$ of the flue gas to form calcium sulfate and is discharged via the sump 5 of the scrubbing tower 4. In this case, the flue gas is cooled to a temperature from about 50° C. to 65° C. The lime suspension collecting in the sump 5 of the scrubbing tower 4 is discharged and, after the gypsum is separated off in hydrocyclones, is recirculated to the scrubbing tower 4. At the top of the scrubbing tower 4, droplet separators 6 are provided which are flushed with process water. Depending on the power plant type, and/or interconnection variants, the flue gas/process gas is heated downstream of the scrubbing tower 4.

For example, the heat content can be displaced from the flue gas before entry into the scrubbing tower 4 to the flue gas after exit from the scrubbing tower 4 or to the boiler feed water preheating or combustion air preheating. Such a heat displacement is not necessarily necessary, and therefore is not shown for reasons of simplicity.

A further scrubbing column 7 is connected as fine scrubber downstream of the scrubbing tower 4. In the fine scrubber, by means of structured or unstructured packings, using cooled circulation water, for example using flue gas condensate, an aqueous NaOH solution is brought into contact in counterflow with the flue gas, in order to achieve further cooling of the flue gas and remove any remainder of $SO_2$. The condensate is collected in the sump 8 of the fine scrubber and utilized as circulation water.

Before the flue gas is introduced into the absorber column 9 of a $CO_2$ scrubber 10 shown in FIG. 2, there is a slight pressure elevation by means of a second fan 11.

The $CO_2$ present in the process gas and/or flue gas is scrubbed out in the absorber column 9 at a low temperature (for example 40° C. to 60° C.) using an aqueous solvent, for example a mixture of water with monoethanolamine (MEA).

After the $CO_2$-loaded solvent/scrubbing agent has been preheated via a cross-flow heat exchanger 12, the $CO_2$-loaded solvent that is thus preheated is introduced into a desorber column 13, which is also termed a stripper. Here, superheated steam at about 110° C. to 130° C. flows against the liquid solvent from bottom close to the desorber sump, which superheated steam is generated in a reboiler 14 by heating a substream of the solvent, for example using low-pressure steam. Here, steam, for example having a vapor pressure of 4 bar, can be used, which was tapped off between the medium-pressure and low-pressure part of a steam turbine of the power plant. At the top of the absorber column 9, the purified process gas is discharged as clean gas.

In order to suppress as far as possible a fine fog discharge containing solvent and/or scrubbing agent at the top of the absorber column 9, and thereby suppress as far as possible a scrubbing agent emission or amine emission, it is provided according to the invention to quench flue gas/process gas at the sites A, B or C with water. Positions A, B or C can designate, for example, water injection coolers or steam feeds. The positions A, B are arranged downstream of the induced draft of the flue gas stream upstream of the scrubbing tower 4 and also upstream (A) or downstream (B) of an optional heat displacement system, position C is situated within the scrubbing tower 4 and denotes, for example, a unit in which quenching, aerosol particle precipitation and desulfurization proceed within the unit.

A precipitation of the very fine aerosol particles that have grown in size by the quenching proceeds in each case in droplet separators 6, 7 or wet electrostatic precipitators 15 that are connected downstream of the scrubbing tower 4 and the fine scrubber 7. The invention is to be understood such that, optionally, a single wet electrostatic precipitator 15 is sufficient in order to retain from the flue gas the aerosol particles that have increased in size by the quenching. These aerosol particles, according to findings of the applicant, are primarily responsible for the amine fog discharge from the absorber column 9.

LIST OF REFERENCE SIGNS

1 Flue gas desulfurization unit
2 Electrostatic precipitator
3 First fan
4 Scrubbing tower
5 Sump of the scrubbing tower
6 Droplet separator
7 Fine scrubber
8 Sump of the fine scrubber
9 Absorber column
10 $CO_2$ scrubber
11 Second fan
12 Cross-flow heat exchanger
13 Desorber column
14 Reboiler
15 Wet electrostatic precipitator

What is claimed is:

1. A method for gas scrubbing of process gas containing aerosol particles, comprising:
   using an amine-containing solvent as a scrubbing agent,
   bringing the scrubbing agent into contact with the process gas containing the aerosol particles in an absorber column and gas scrubbing the process gas containing the aerosol particles with the scrubbing agent in the absorber column, and
   regenerating the scrubbing agent in a desorber column and, after cooling, feeding the scrubbing agent back to the absorber column, wherein a water vapor concentration of the process gas containing the aerosol particles is increased with water before the gas scrubbing in the absorber column, such that the water condenses on the aerosol particles present in the process gas to grow the aerosol particles in size, and that, in a following method step, precipitating the aerosol particles that have grown in size from the process gas before the gas scrubbing, wherein the water vapor concentration of the process gas is adjusted to a degree of saturation of >0.8 by passing it through a foam scrubber, dispersant scrubber, or bubble-layer scrubber in each case as a gas-liquid contact apparatus having perforated plates, roller plates or tube internals in which the gas flows through a liquid layer or foam layer.

2. The method as claimed in claim 1, wherein the concentration of the aerosol particles having a diameter<0.2 μm in the process gas is adjusted before the gas scrubbing to <60 000/m$^3$ of process gas.

3. The method as claimed in claim 1, wherein the aerosol particles, after increase in size by water vapor condensation, are precipitated in a corona-aerosol separator or in a wet electrostatic precipitator.

4. The method as claimed in claim 1, wherein the method comprises the gas scrubbing of flue gases from a power plant as aerosol-containing process gas, wherein the method comprises a wet flue gas desulfurization and also a $CO_2$-capture downstream of the flue gas desulfurization as gas scrubbing.

* * * * *